United States Patent Office 3,058,803
Patented Oct. 16, 1962

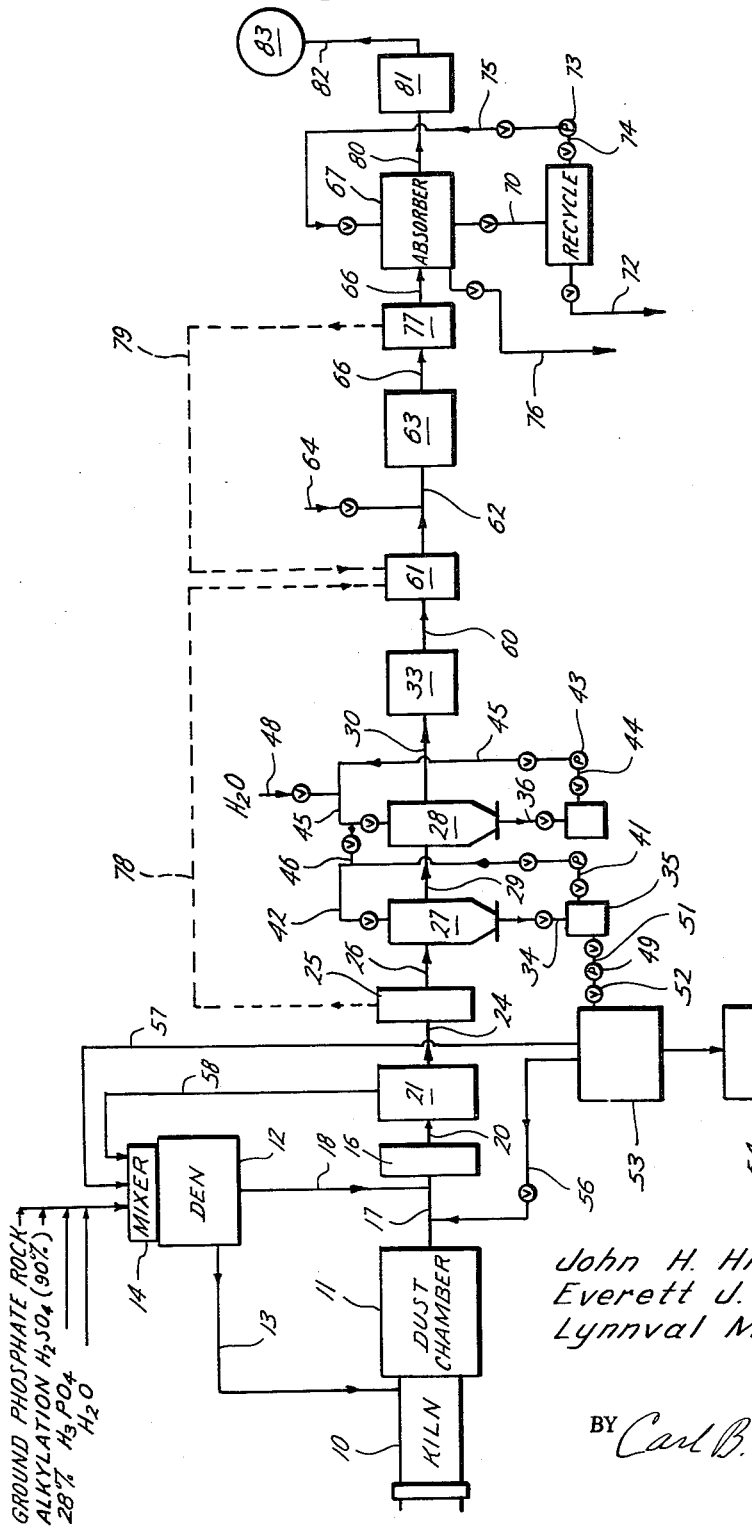

3,058,803
WASTE RECOVERY PROCESS
John H. Hinkle, Jr., Houston, and Everett J. Weaver and Lynnval M. Smith, Pasadena, Tex., assignors, by mesne assignments, to Hooker Chemical Corporation, New York, N.Y., a corporation of New York
Continuation of application Ser. No. 707,166, Jan. 6, 1958. This application Mar. 15, 1960, Ser. No. 15,118
6 Claims. (Cl. 23—88)

This invention pertains to the recovery of components from gasiform mixtures, and, more particularly, the invention pertains to the recovery of sulphur dioxide, sulphur trioxide, and fluorine from waste gases effluent from chemical plants such as those for acidulation and/or calcination of phosphate minerals, e.g. phosphate rock.

This application is a continuation of our copending application S.N. 707,166, filed January 6, 1958, entitled "Waste Recovery Process and Apparatus," which application has now been abandoned.

A principal object of the invention is to provide a process for recovering gasiform sulphur compounds and fluorine from gasiform mixtures.

Another object of the invention is to provide such process suitable for use in recovering such gasiform materials from waste gases of installations for acid, or other, treatment and/or calcination of phosphate minerals.

A further object of the invention is to provide such process which is efficient, is of minimum cost, is free from troublesome operating difficulties, and which emit no noxious or other objectionable effluents.

A second principal object of the invention is to provide a process of the type described wherein the recovered materials are in valuable forms.

Another object of the invention is to provide such process with which sulphur compounds are recovered in the form of high-grade clean or fresh sulphuric acid, even though the reaction from which the stock gases are derived is carried out with sulphuric acids of alkylation or other "dirty" grade. Thus, the recovered sulphuric acid is of much greater value than the sulphuric acid originally used in the process.

Another object of the invention is to provide such process from which there flows no liquid waste to contaminate sewage or other streams in the plant area.

Another object of the invention is to provide a process for alleviating or eliminating air pollution problems and waste.

Industrial plants for the treatment of phosphatic minerals, and the various processes therein employed, are notable in the noxiousness of their effluents, particularly their gasiform effluents. The stacks of such plants, practically without exception, emit noxious materials in relatively tremendous quantity, and are, therefore, a nuisance and often a menace to surrounding areas, both within and without the plant site. Furthermore, the emissions constitute a waste of potentially valuable materials. In such plants employing sulphuric acid as a treating material, gaseous forms of sulphur are passed out of the stack. Fluorine compounds of diverse constitution are likewise present in the stack gases, these being formed from fluorine present in the phosphatic minerals.

This invention contemplates the removal and recovery of the sulphur and fluorine compounds by first scrubbing the stack gases with water, and then by treatment of the water and non-soluble gases to recover sulphur and fluorine in desirable forms. The sulphur is recovered as high-strength sulphuric acid. The fluorine is recovered as a usable fluorine product. The invention, therefore, besides alleviating the nuisance of noxious wastes passed into the atmosphere, also provides for the improvement of the plant economy through recovery and sale of valuable by-product materials.

Other objects and advantages of the invention will appear from the following description of preferred embodiments of the process, reference being made to the accompanying drawings showing a flow diagram of the process in schematic form.

A part of a more or less typical phosphate processing plant is included in the drawing, there being shown of this plant a rotary kiln 10 having the "feed" end thereof sealed to a dust chamber 11, the kiln being rotatably mounted. Kiln 10 is of the usual form, having a steel outer shell and being internally lined with refractory material, such as fire brick. Freshly prepared superphosphate is delivered to the kiln 10 from a denning unit 12 by a conveyor 13, of any suitable type. A mixer 14, preferably of the pug mill type having a rotatable bladed mixing shaft, mixes ground phosphate rock (apatite), alkylation grade sulphuric acid (88% $H_2SO_4$, approximately), phosphoric acid (28% $P_2O_5$), and water to form the superphosphate, which is delivered to the denning unit 12 for a short period to allow the texture of the superphosphate mixture to improve. In the kiln, the superphosphate is calcined to produce a substantially fluorine-free, sulphur-free tricalcium phosphate product suitable for use as a mineral feed supplement for animal feeding. The complete phosphate treating process, here only partially shown, is described in detail in our prior application for U.S. Letters Patent, S.N. 682,801, filed September 9, 1957, and entitled "Tricalcium Phosphate," which application has now been abandoned, a continuation-in-part thereof, S.N. 708,832, filed January 14, 1958, by the same applicants and having the same title, being now pending.

A stream of combustion and other gases is drawn from the kiln, by a fan 16, through dust chamber 11 and connecting duct 17. Fan 16 also draws a gas stream from the denning unit 12 through a duct 18, duct 18 being connected into duct 17 so that the two gas streams are there mixed together. Both of the gas streams, and the mixture, are made up of air, water vapor, gaseous fluorine compounds, sulphur dioxide ($SO_2$), sulphur trioxide ($SO_3$) and entrained or suspended solid superphosphate and/or tricalcium phosphate which, in the case of the gas stream from the kiln, was not settled out in dust chamber 11. Dust chamber 11 is an enclosed space of relatively large volume, and consequently small gas velocity wherein dust particles withdrawn from the kiln settle out of the gas stream.

A duct 20 leads the mixed gas streams from the discharge of fan 16 to a "Dustex" unit 21. The "Dustex" unit is a high-velocity multiple cyclone separator well known in the art, and requires no further description.

From the discharge point of the "Dustex" unit, the gas stream passes through a duct 24 to a heat removal unit (or cooler) 25, from which the gas stream flows through a duct 26 to a first scrubber 27. A second scrubber 28 receives the gaseous discharge from scrubber 27 through a duct 29. The process discharge from scrubber 28 is directed through a duct 30 to a dehumidifier 33, which forms the initial unit of the apparatus for recovering sulphur.

The plant units and steps which have been described through the "Dustex" unit 21, are part of the phosphate plant here partially shown. The present process and apparatus has as its first unit the heat removal unit 25.

Scrubber 27 has a valved liquid drain conduit 34 leading into a scrubber slurry tank 35. Scrubber 28 has a valved liquid drain conduit 36 leading into a liquor recycle tank 37. A pump 40 pumps slurry from tank 35 through valved pipes 41, 42 into the top of scrubber 27. A pump 43 pumps liquor from tank 37 through valved pipes 44, 45 into the top of scrubber 28. A valved crossover pipe 46 connects between pipes 42 and 45 so that scrubber slurry from tank 37 may be pumped to scrubber 27. A valved water supply pipe 48, from a suitable fresh water source, is connected into pipe 45.

A pump 49 pumps scrubber slurry from tank 35 through valved pipes 51, 52 to the fluorine purification portion of the process indicated at 53. A purified fluorine product 54 is delivered from process portion 53.

Fumes from process portion 53 are recycled through a valved conduit 56 to duct 17. Solid non-fluoride phosphate material is returned by conveyor 57 to superphosphate mixer 14. Dust separated from the gas stream by "Dustex" unit 21 is also returned to mixer 14 by a conveyor 58.

Dehumidifier 33 is the first unit of the sulphur recovery process wherein $SO_2$ and $SO_3$ are converted to fresh high-grade sulphuric acid. A duct 60 conveys the scrubbed and dried gases from dehumidification unit 33 to a heat exchanger (or heater) 61, from whence the gases pass through a duct 62 to a catalytic oxidation chamber 63. A supply of air, the useful component of which for the process is oxygen ($O_2$), is passed from atmosphere to duct 62 through valved duct 64.

In chamber 63, sulphur dioxide ($SO_2$) is reacted catalytically with oxygen ($O_2$) according to the chemical reaction: $2SO_2+O_2 \rightarrow 2SO_3$. Sulphur trioxide ($SO_3$) entering chamber 63 from duct 62 is unaffected. A useful catalytic material for the reaction is comprised of finely divided platinum (Pt) on an aluminum (Al) carrier. The aluminum is supported on porcelain bars or rods a plurality of which are arranged in spaced relation with chamber 63 so that the contact between the gas stream and catalyst is extensive. The platinum is a catalyst for the reaction whereby sulphur dioxide is converted to sulphur trioxide.

The sulphur recovery portion of the plant is of the type conventionally used for manufacture of sulphuric acid from sulphur. In the conventional plant, sulphur is burned in air, forming sulphur dioxide and a small amount of sulphur trioxide, this mixture of gases in air being passed over a platinum or vanadium catalyst to convert substantially all of the sulphur dioxide to sulphur trioxide. The principal difference between the sulphur recovery unit now described and the conventional unit is that the concentration of sulphur dioxide and sulphur trioxide in the gases of the present unit is more dilute than in the conventional unit.

After the gases have passed through catalyst chamber 63, the sulphur now being substantially all in the form of sulphur trioxide, they are directed by a duct 66 into a sulphur trioxide absorbing tower 67 wherein the sulphur trioxide is absorbed in, or dissolved in, a solution of relatively strong sulphur acid. Tower 67 is usually a "packed" tower of some form, being preferably packed with acid-proof ceramic or stone pieces. Sulphuric acid solution which has passed downwardly through tower 67 to absorb sulphur trioxide from the gas stream entering the tower through duct 66 drains out of the tower 67 through a valved pipe 70 into a sulphuric acid recycle tank 71, the latter containing a supply of such sulphuric acid. Water is added to the acid in tank 71 through a valved pipe 72 which extends from a suitable fresh water supply source. A pump 73 withdraws sulphuric acid from tank 71 through a valved pipe 74, and delivers the acid through a valved pipe 75 into the top of tower 67, the acid passing down through the tower over the packing therein to absorb additional sulphur trioxide, and then returning through pipe 70 to recycle tank 71.

White or fresh sulphuric acid ($H_2SO_4$) of high strength and purity is withdrawn from the lower end of tower 67 through a valved pipe 76, and is collected in a suitable storage tank (not shown) from which it is delivered for use. This acid constitutes the recovered sulphur product, and is usually of a concentration of approximately 97–99% $H_2SO_4$, preferably about 98% $H_2SO_4$, by weight.

Duct 66 has, intermediate of its length, a cooling unit 77, through which the converted gases from chamber 63 pass before they are introduced into tower 67. As is indicated by the dashed lines 78, 79, the heat removal unit 25, the heat addition unit 61, and the heat removal unit 77 may be intercombined in a heat exchanging device (not shown) as is known in the art, so that heat required in unit 61 is derived in units 25 and 77. Such heat exchange devices are well known, and no further description thereof should be required here.

Gases from which the sulphur trioxide had been absorbed in tower 67 pass therefrom through a duct 80 into a fan or blower 81, fan 81 delivering the gases through a duct 82 into a stack 83. These gases contain only traces of sulphur compounds and present no air pollution hazard, and consequently can be safely passed through stack 83 to the atmosphere. No significant waste of sulphur materials is involved in this disposal of the gases.

The sulphur recovery process which has been described, including the units designated by reference numerals 33, 60—64, 66—67, 70—83, is a portion of a conventional sulphuric acid plant and process which has previously been referred to above. This part of the present process has been only described briefly since such are well known in the art, there being a number of forms available for application to the present process.

The fluorine recovery process is indicated by reference numeral 53. The preferred form of fluorine recovery for use with the overall recovery process is to recover the fluorine as sodium fluosilicate, $Na_2SiF_6$. The inflow to the fluorine recovery process through valved pipes 51, 52 is a solution or slurry which contains about 12% F, by weight, in solution. The solid material usually suspended in the solution or slurry is gypsum ($CaSO_4 \cdot 2H_2O$) and/or undissolved tricalcium phosphate ($Ca_3(PO_4)2$). The dissolved fluorine is believed present as HF and/or $SiF_4$ and/or $H_2SiF_6$. The first step toward recovering the fluorine is to contact the solution with silica ($SiO_2$) in some form, such as ordinary said, in order to convert the HF also to $SiF_4$ and/or $H_2SiF_6$. The chemical reaction for this change is: $4HF+SiO_2 \rightarrow SiF_4+2H_2O$. $SiF_4$ combines with free water: $3\ SiF_4+2H_2O \rightarrow 2H_2SiF_6+SiO_2$. Hyrofluosilicic acid ($H_2SiF_6$) is precipitated by addition of soda ash ($Na_2CO_3$) to the solution after the solution has been treated by, or reacted with, the sand: $Na_2CO_3 + H_2SiF_6 \rightarrow Na_2SiF_6+H_2CO_3$ (sodium silicofluoride + carbonic acid). The carbonic acid readily decomposes: $H_2CO_3 \rightarrow CO_2$ (agas) $+H_2O$. The precipitated product, sodium silicofluoride (sodium fluosilicate) is removed from slution by filtration any may be water-washed to remove any contaminating materials in the mother liquor from which it is filtered.

The solid impurities in the solution or slurry delivered by pipe 52 usually amounts to about ½ percent by weight of $CaCO_4 \cdot 2H_2O$ and/or $Ca_3(PO_4)_2$.

The above-described fluoride precipitation method is preferred, since fluorine is thereby converted to a useful and valuable form which is easily handled. The above-described fluorine precipitation is well known, and a number of other processes for fluoride separation may be used in place thereof, these being amply described in the literature.

The following Table I shows the compositions of the materials at points of the process described, the compositions being designated by the reference numerals designating the various points in the drawings:

be continuously withdrawn from tank 35 through pipes 51, 52 by pump 49 to the fluorine purification process 53.

TABLE I

*Compositions and Flow Rates at Various Points in the Process*

| Point in the process | Types of materials | Material compositions (percent by weight) | | | | | | | | Material flow rates, liquids, solids and slurries, tons (2,000 lb.) per day | Gases and vapors Cubic feet per minute |
|---|---|---|---|---|---|---|---|---|---|---|---|
| | | $P_2O_5$ | CaO | $H_2SO_4$ | $H_2O$ | F | $SO_2$ | $SO_3$ | Solids in gases or slurries | | |
| Materials fed to mixer | Phosphate rock | 34.3 | | | | 3.75 | | | | 156 | |
| | Sulfuric acid | | | 90 | 5 | | | | | 78 | |
| | Phosphoric acid | 28 | | | | 0.7 | | | | 65 | |
| | Water | | | | 100 | | | | | 7 | |
| | Dust via conveyor 58 | 38 | | | | 1.0 | | | | 13 | |
| | Material via conveyor 57 | | | | | | | | | | |
| Material in conveyor 13 | Superphosphate | 27.0 | 28.8 | 26.0 | 22.0 | 2.0 | | | | 252 | |
| Material through ducts 17, 18, fan 16, and duct 20. | Gases and suspended dust. | | | | | 0.87 | 5.0 | 1.5 | 2.0 | (Approx. 720 tons/day of gases) 14.4 dust. | 35,000 (at 1 atm., 800° F.). |
| | (F) | | | | | | | | | (6.3) | |
| | ($SO_2$) | | | | | | | | | (36.0) | |
| | ($SO_3$) | | | | | | | | | (10.8) | |
| Material through duct 24. | Gases and suspended dust. | | | | | 0.89 | 5.1 | 1.53 | 0.2 | (Approx. 720 tons/day of gases) 1.4 dust. | 32,200 (at 1 atm., 700° F.). |
| | (F) | | | | | | | | | (0.6) | |
| | ($SO_2$) | | | | | | | | | (3.6) | |
| | ($SO_3$) | | | | | | | | | (1.1) | |
| Material through duct 30. | Gases | | | | | (¹) | 0.02 | 5.0 | 1.45 | 0.0 | (Approx. 140° F.). |
| | (F) | | | | | | | | | (0.2) | |
| | ($SO_2$) | | | | | | | | | (36.0) | |
| | ($SO_3$) | | | | | | | | | (10.0) | |
| Materials through pipes 51, 52. | Water dissolved materials, solids (slurry). | 0.5 | | ²1.0 | | 12.0 | | | 1.0 | 50 (approx. 140° F.) | |
| | (F) | | | | | | | | | (6.0) | |
| | (Solids) | | | | | | | | | (0.5) | |
| | ($SO_4$) | | | | | | | | | (0.5) | |
| | ($P_2O_5$) | | | | | | | | | (0.25) | |
| Sulphur product from pipe 76. | $H_2SO_4$ | | | 98 | 2 | | | | | 68.7 (67.2 $H_2SO_4$) | |
| Fluorine product at 54. | $Na_2SiF_6$ | | | | | ³100 | | | | 59.5 | |

¹ Saturated.   ² As $SO_4$.   ³ As $Na_2SiF_6$.

Referring to Table I in conjunction with the drawing, it is apparent that the recoveries of sulphur and of fluorine are very high, nearly 100%. Using the exemplary production rate of Table I, which is for tricalcium phosphate production at the rate of 156 tons (2000 lbs.) per day out of kiln 10, sulphur is recovered as sulphuric acid at a rate of 68.7 tons per day of 98% $H_2SO_4$, and fluorine is recovered as sodium fluosilicate at a rate of 59.5 tons per day. Thus, materials which have heretofore been wasted as gases or dusts passed to the atmosphere can now be recovered in useful and pure forms, and in substantial amounts. Furthermore, neither air pollution nor surface water pollution results from the use of the described process.

With continued reference to Table I and to the drawing, the operation of scrubbers 27 and 28 is adjusted so that the slurry passing out of tank 35 through pipes 51, 52 contains about 12% fluorine by weight. Scrubbers 27 and 28 are preferably each of the type having a liquid stream entering at the top of a vertically elongate chamber. The gas stream enters the chamber tangentially near the top of the chamber but below the point of entry of the liquid stream and at a point of restricted flow of the liquid stream. This type of liquid-gas contact results in intimate mixing of the liquid and gas with consequent high scrubbing efficiency. A commercially available form of this type of scrubber is the "Schutle and Kverting" scrubber.

The fluorine concentration in the liquid or slurry circulating from tank 35, through pipe 41, pump 40, pipe 42, downwardly through scrubbing tower 27, and thence through drain 34 to tank 35, is maintained at about 12% F by the introduction of liquid of lower fluorine concentration through crossover pipe 46, so that slurry of more or less constant fluorine concentration of about 12% F can The fluorine concentration in the liquid or slurry circulating from tank 37 through pipe 44, pump 43, pipe 45, scrubbing tower 28, and through drain 36 to tank 37 is at a lower fluorine concentration, and is maintained at the lower concentration by continuous addition of fresh water through pipe 48. Slurry is bled from this circulation stream to the stream circulating through tower 27 through crossover pipe 46, as mentioned before.

Thus the circulating liquid or slurry streams through the two towers 27, 28 can each be maintained at substantially constant fluorine concentration, and slurry of substantially constant fluorine concentration can continuously be withdrawn from tank 35 to fluorine purification process 53. Maintenance of these conditions is easily regulated by adjustment of the controlling valves and pumps of the systems.

By proper selection of towers 27, 28, and by proper control of the liquid streams circulating through the towers in the described manner, the efficiency of tower 27 in removal of fluorine from the gas stream entering at pipe 26 is in the range of about 85% to about 93%, and usually 90%; the efficiency of towers 27 and 28 together in removal of fluorine from gas passed through both towers is in the range of about 94% to about 100%, and usually 96%.

Further illustrating the efficiency of the process, the phosphate rock and phosphoric acid fed to mixer 14 contain (156×3.75/100) plus (65×0.7/100), or 6.3 tons per day of fluorine (F). Virtually all of the fluorine is carried with the gas stream from the kiln to scrubbers 27, 28. The scrubbers remove from about 94% to 100% of the fluorine from the gas stream for recovery. The fluorine purification unit is nearly 100% efficient. Therefore, the overall fluorine recovery efficiency is approximately that of the scrubbing efficiency, or from about 94% to nearly 100%.

The efficiency of the sulphur recovery portion of the process is in the neighborhood of 98% recovery of sulphur ($SO_2$ and $SO_3$) in the gases entering at duct 30, and the waste sulphur gases at stack 83 amount to only traces in the exhausted gas stream.

The sulphur recovery portion of the unit differs from ordinary sulphuric acid plants of this type in that there is no recycling of the gas stream.

It should be noted that two fans or blowers 16 and 81 provide for the gas movements throughout the process equipment, being arranged for continuous operation throughout.

Essentially, the process comprises scrubbing the gas stream effluent of a phosphate acidulation and calcination plant with an amount of water sufficient to absorb substantially all of the fluorine compounds from the gas stream, but leaving substantially all of the sulphur compounds in the gas stream. Thus, as has not been known before, a substantially complete separation of the fluorine and sulphur compounds is effected. The fluorine is recovered, more or less conventionally, by chemical conversion and precipitation, or other suitable manner. The sulphur is recovered, more or less conventionally, by catalytic conversion to $SO_3$ and absorption in strong $H_2SO_4$. The invention affords, for the first time, a process and apparatus whereby the valuable sulphur and fluorine wastes may be efficiently recovered at relatively low cost compared with their recovered values.

While preferred embodiments of the process and apparatus according to the invention have been shown and described, many modifications thereof may be made by a person skilled in the art without departing from the spirit of the invention, and it is intended to protect by Letters Patent all forms of the invention falling within the scope of the following claims.

We claim:

1. Process for recovering gaseous fluorine materials and gaseous sulphur materials from waste gas mixtures obtained from acidulation and/or calcination of phosphate minerals comprising the following steps:
    (1) scrubbing a gas mixture containing gaseous fluorine materials and gaseous sulphur materials with water to dissolve said fluorine materials therefrom and withdrawing the scrubbing water; and
    (2) separating the dissolved fluorine materials from the water of scrubbing step (1) by
    (3) subsequently converting the fluorine materials to a form insoluble in said water; and
    (4) flowing the gas mixture which has been scrubbed in scrubbing step (1) in a non-recirculated continuous stream through a unit for converting all sulphur materials therein to sulphur trioxide and absorbing the sulphur trioxide in sulphuric acid to produce sulphuric acid.

2. Process according to claim 1, step (3) of claim 1 including reacting the absorbed fluorine materials with sand to convert HF and $F_2$ to $SiF_4$ and $H_2SiF_6$, precipitating the $SiF_4$ and $H_2SiF_6$ by addition of soda ash to precipitate $Na_2SiF_6$, filtering the $Na_2SiF_6$ from the water in which the fluorine materials were absorbed; step (4) of the process also including drying the scrubbed gas mixture before flowing it through said converting unit.

3. Process according to claim 2, said fluorine materials in the gas mixture including one or more of the materials, $F_2$, HF, $SiF_4$, and $H_2SiF_6$, and said sulphur materials in the gas mixture including one or more of the materials, $SO_2$ and $SO_3$.

4. Process according to claim 3, said gas mixture being derived from a phosphate acidulation and calcination plant, said gas mixtures containing phosphate compounds and gypsum in dust form, said process also including, prior to step (1), removing the bulk of the dust from the gas mixture in a separator unit of high efficiency, removing the remainder of the dust from the gas mixture by adsorbing it in water together with the fluorine materials, separating the fluorine as described according to step (3), and recycling the dust from the separator unit and the absorbed dust to the phosphate plant.

5. Process according to claim 4, including cooling the gas mixture prior to scrubbing step (1) to prevent heating of the scrubbing water, heating the gas mixture after said drying thereof to improve said conversion of sulphur materials to sulphur trioxide, and cooling the gas mixture before said absorption of sulphur trioxide therefrom to facilitate said absorption.

6. Process according to claim 5, said gas heating and cooling being performed in a counterflow manner to be complementary, and said water being recycled to scrub said gas mixture to produce a constant fluorine concentration therein of about 6 to 15% F for withdrawal to said sand reaction.

References Cited in the file of this patent

UNITED STATES PATENTS

| | | |
|---|---|---|
| 1,627,977 | Krafft | May 10, 1927 |
| 1,896,287 | Clark | Feb. 7, 1933 |
| 2,163,371 | Castner | June 20, 1939 |
| 2,354,177 | Kawecki | July 18, 1944 |
| 2,447,359 | Oakley | Aug. 17, 1948 |
| 2,655,431 | Allen et al. | Oct. 13, 1953 |
| 2,813,000 | Quittenton | Nov. 12, 1957 |